Dec. 14, 1965 H. H. TODD 3,223,878
METHOD OF FABRICATING FINE GRIDS
Filed Sept. 17, 1962
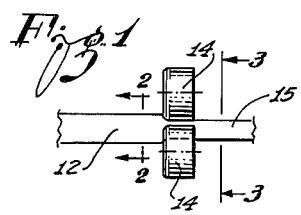
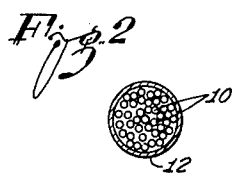
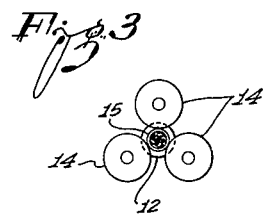
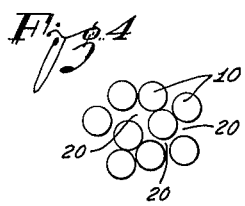
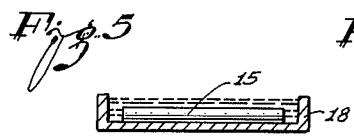
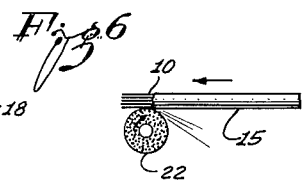
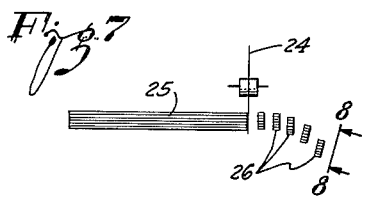
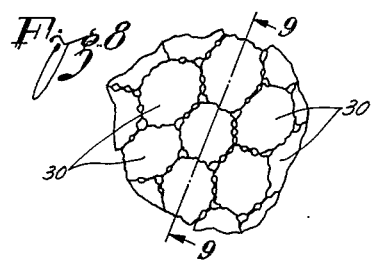
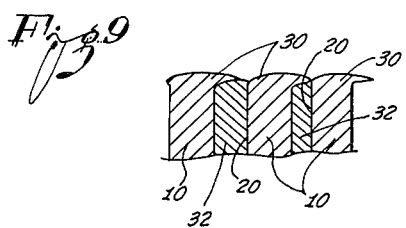
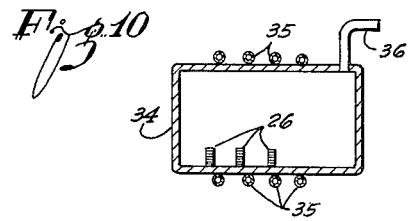
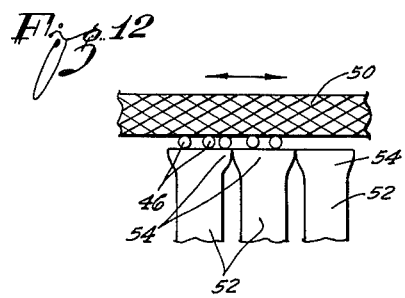
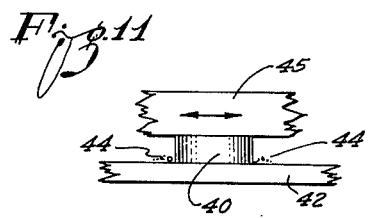
INVENTOR:
Hoyt H. Todd
By Jesse M. Roberts
Attorney United States Patent Office 3,223,878
Patented Dec. 14, 1965

3,223,878
METHOD OF FABRICATING FINE GRIDS
Hoyt H. Todd, La Habra, Calif., assignor to Electro-Optical Systems, Inc., Pasadena, Calif., a corporation of California
Filed Sept. 17, 1962, Ser. No. 223,942
15 Claims. (Cl. 313—348)

This invention relates to a grid or filter unit of the general type that utilizes a bundle of closely packed parallel wires or filaments and the invention is directed to the dual problem of providing such a unit with exceedingly fine interstices and of achieving substantial uniformity in the size and distribution of the interstices.

While the invention is widely applicable for its purpose, it has special utility for the fabrication of grids or filter units having interstices of exceedingly small dimension. The need for such a fine grid arises, for example, in the construction of an ion engine because the ion current density for a given applied voltage varies inversely with the size of the grid interstices. Theory indicates that an ion engine grid should have uniformly distributed interstices or through passages of 0.5 to 2 microns in cross-sectional dimension at uniform spacing of 2 to 6 microns.

Many grid structures have been developed that incorporate a closely packed bundle of wires or the like because such a bundle forms interstices of substantially smaller cross section than the wires. The prior art further teaches that such interstices may be reduced in size by contracting the bundle of wires radially under high pressure. For this purpose it is common practices to place a bundle of wires in a metal tube and then swage the tube to decreased diameter to deform the wires in cross section.

Such a procedure for producing a grid as taught by the prior art falls short of the desired result. In the first place, it has been found that with the greatest care and with the use of contracting force of high magnitude the wires do not pack uniformly. When such a bundle of fine wires is inspected under a microscope it is found that the wires are packed in an irregular manner and that some of the interstices formed by the packed wires are actually larger in cross-sectional dimension than the wires themselves. All attempts to solve this problem by the use of lubricants, hot pressing and hydrostatic pressing have failed.

In the second place, using wires of the smallest practical diameter and contracting a bundle of such wires under high pressure fails to produce interstices as small as desired. For example, a bundle of wires of 0.0005 inch diameter falls far short of forming interstices averaging under 50 microns in cross section.

The present invention makes perfect packing of the bundle of wires unnecessary by, in effect compensating for imperfect packing. This result is accomplished by enlarging the wire ends to cause the wire ends to expand laterally into the interstices to restrict the interstices to substantially uniform dimension. Thus the metal of the wires is automatically deformed across relatively large interstices to greater degree than across relative small interstices. The ends of the bundle wires may be deformed in various ways to carry out this concept.

One procedure for enlarging the wire ends in the desired manner is to apply coarse abrasive to the end of a compacted bundle of wire, the abrasive in effect smearing the metal across the interstices. As another example, hard spherical metal particles may be rolled across the end of a bundle of wires under pressure to peen the wire ends, the peening action being advantageous because it is effective to a substantial depth. In the presently preferred practice of the invention, however, a suitable saw, for example a diamond saw, is used to perform two functions. The saw slices a grid unit from a compacted bundle of wires and simultaneously deforms the severed ends of the wires in the desired manner.

A simple practice of the invention to produce a grid for use at moderate temperatures comprises using fine wires of a relatively ductile metal such as nickel, encasing a bundle of the wires in a tube of suitable metal, reducing the cross section of the assembly by swaging the tube, and then sawing the tube transversely into the desired grid units. The grid units may be used as produced in this manner or the grid units may be sintered in a vacuum prior to use.

One advantage of the additional sintering step is that it bonds the wires of the bundle together to make the surrounding metal casing or tube section unnecessary. The sintering step also serves to preheat the bundle of wires to stabilize the filter unit for high temperature use. In addition, the sintering step has a shrinkage effect on the bundle of wires and the shrinkage slightly opens the restrictions formed by the enlarged wire ends for slight increase in the size of the interstices where such slight increase is desirable.

In another practice of the invention, the wires of the bundle are made of less ductile metal, for example tungsten or molybdenum. Because such wires are relatively brittle, the use of the saw or other instrumentality to deform and enlarge the wire ends tends to fracture the wire ends. This problem is solved by infiltrating the bundle of wires with some temporary support material that does not alloy with the metal of the wires. Since tungsten will not dissolve in copper, copper may be used as temporary support material to fill the interstices of a bundle of tungsten wires. If the wires are made of stainless steel, silver for example may be used for the temporary support material instead of copper. Various other materials may be used for the same temporary support purpose, such as various plastics, waxes and molten salts.

A sintering step after the deformation of the wire ends is desirable for the previously mentioned effects and especially so if the grid units are to be used at high temperatures. A feature of the invention is that the sintering step may serve the additional purpose of removing the temporary support material from the interstices of the wire bundle.

The features and advantages of the invention may be understood from the following detailed description and the accompanying drawing.

In the drawing, which is to be regarded as merely illustrative:

FIG. 1 is a simplified side elevational view of a metal tube encasing a bundle of fine wires, the metal tube being in the process of reduction in diameter by a set of swaging rolls;

FIG. 2 is an enlarged fragmentary transverse section of the metal tube taken along the line 2–2 of FIG. 1;

FIG. 3 is a transverse section along the line 3—3 of FIG. 1 showing the three swaging rolls;

FIG. 4 is a greatly enlarged cross section of a portion of the wire bundle after the swaging step;

FIG. 5 is a sectional view showing how the swaged tube with the confined wires therein may be placed in a bath of molten coppper to cause the interstices formed by the bundle of wires to be filled with copper, the copper bonding the wires together;

FIG. 6 is a simplified side elevational view illustrating the step of removing the metal casing from the bundle of wires by a grinding operation;

FIG. 7 is a simplified side elevational view showing how the bundle of copper-bonded wires with the metal casing removed may be sliced by a diamond saw into a plurality of grids;

FIG. 8 is a fragmentary end elevational view greatly magnified as seen along the transverse line 8—8 of FIG. 7 showing how the diamond saw that severs the individual grids serves the purpose of enlarging the ends of the individual wires by smearing the metal of the wires transversely across the interstices;

FIG. 9 is an enlarged fragmentary cross section along the line 9—9 of FIG. 8 showing how the deforming of the wire ends displaces the metal of the wires across the interstices;

FIG. 10 is a simplified sectional view illustrating the step of sintering the individual grids in a suitable furnace under a vacuum;

FIG. 11 is a simplified side elevational view showing how the step of enlarging the wires ends of a grid may be carried out by bonding the grid to a suitable support and then applying coarse abrasive across the end of the bundle; and FIG. 12 is a greatly enlarged fragmentary sectional view showing how the ends of the wires in a bundle may be peened by the application of spherical metal powder under pressure to spread the metal of the wire ends across the adjacent interstices.

FIG. 1 shows a bundle of wires encased in a metal tube, the wires, for example, being of a diameter of 0.0005 inch and the tube being a tantalum tube having an inside diameter of a quarter of an inch and a wall thickness of 0.185 inch. To produce a grid for use in an ion engine as in this example, the wires are made of tungsten. For some other purpose the wires may be made of other materials including nickel and stainless steel. Such a bundle of the fine wires may be produced by winding the wires on a narrow reel with the aid of a level-wind mechanism and then cutting and straightening the wound annular bundle.

Referring to FIG. 2, the bundle of individual fine tungsten wires 10 is inserted into a tantalum tube 12, and then, as indicated in FIGS. 1 and 3, the tantalum tube is moved lengthwise through a set of three swaging rolls 14 for substantial reduction in diameter of the tube and consequent transverse packing and distortion of the confined wires. FIG. 4 indicates the manner in which the individual wires 10 are packed together and deformed to a minor degree by the swaging action to result in interstices 20 that are smaller in cross dimension than the interstices in FIG. 2 prior to the swaging operation.

The next step is to infiltrate the interstices 20 of the bundle of wires with suitable support material. As illustrated in FIG. 5, this step may consist of immersing the contracted tantalum tube 15 in a body of molten copper in a suitable receptacle 18 to cause the molten copper to enter the interstices of the wire bundle by capillary attraction. When the infiltrated molten copper solidifies it bonds the wires 10 together and the contracted tantalum tube 15 may be processed, for example, by a grinding wheel 22 for complete removal of the tantalum tube to expose the bundle of copper-bonded wires.

As illustrated by FIG. 7, the next step in this first practice of the invention is to use a diamond saw 24 to cut the bundle 25 of copper-bonded wires transversely into a plurality of slices or units 26. In this slicing operation the effect of the diamond saw 24 is to deform the severed ends of the wires by enlarging the wire ends, the enlarging action consisting in spreading or smearing the material of the ends of the wires transversely in the manner indicated by FIG. 9. In FIG. 9 the wires 10 are formed with end enlargements 30 that extend laterally over the copper 32 that fills the interstices 20. In FIG. 8 showing the sliced bundle in end elevation it is apparent that the end enlargements 30 of the individual wires spread across the wire gaps to restrict the interstices to a high degree to result in exceedingly fine grid passage at points around each enlarged wire end 30 and especially where three of the wire ends tend to meet.

The next step in this first practice of the invention is to sinter the sliced units 26 in a closed furnace 34 that is heated by a coil 35 and is provided with a pipe 36 connected to a suitable exhaust pump for creating a vacuum in the furnace. Excellent results are obtained by sintering in two stages, the first stage being carried out at 1500° C. in a vacuum of $10^{-4}$ mm. of mercury for 30 minutes, the second stage being carried out at 2000° C. for 15 minutes. With the ends of the wires joined by the metal bridges as produced by the diamond saw, the densification of the wire compact in the sintering process appears to start at the joined ends of the wires and to progress longitudinally along the wire axes with the result that considerable shrinkage and densification of the wire bundle occurs. It is difficult to explain why the wires maintain their individual identity during the recrystallization resulting from the sintering operation. During the sintering operation the copper support material is evaporated from the interstices and the wires coalesce at points of mutual contact leaving the wires bonded together by the metal bridges at their outer ends and fused together at other points to form a unitary metal grid. The grid is then ready for use in an ion engine.

If the enlarged wire ends or metal bridges 30 of a finished grid are removed by an etch composed of 50 volumes percent each of 30% $H_2O$ and $NH_4OH$ the appearance of the ends of the grid shown in FIG. 8 changes to the appearance shown in FIG. 4, the exposed wire ends then having the original imperfect arrangement.

In a second simpler practice of the invention to produce grids for use other than in an ion engine, wires are employed that are relatively ductile and therefore the infiltration of support material is not necessary. The wires 10 may be made of nickel, for example. The step of infiltrating the encased wire bundle with a support material is omitted and the metal casing is not removed from the bundle. In other words, the steps illustrated by FIGS. 5 and 6 are omitted.

The bundle of wires encased in the metal tube is sliced into units by a diamond saw as illustrated in FIG. 7 to result in finished grids of the character described because the diamond saw smears the ends of the nickel wires in the manner heretofore described. It is because nickel is relatively ductile that the presence of a supporting material in the interstices is not required as the diamond saw deforms and displaces the ends of the wires in the manner described. A resulting grid has a metal jacket comprising a section of the original metal tube, the metal jacket serving to hold the wires together in compact grouping. If the grid is to be used in a high temperature environment, the grid may be sintered to stabilize the grid against the effects of high temperature. Since the sintering step bonds the nickel wires together, the cylindrical metal casings may then be removed.

FIG. 11 shows how a bundle of short wires with clean-cut ends in a cylindrical metal casing 40 may be processed to form the enlarged wire ends or metal bridges 30 shown in FIGS. 8 and 9. The metal casing is temporarily mounted on a rigid base 42 by suitable adhesive 44 and then an abrading device 45 in the form of a file or a relatively coarse emery wheel may be applied to the wire ends to produce the desired metal bridges.

FIG. 12 indicates how a metal powder comprising spherical particles 46 may be used to produce the metal bridges by lateral displacement of the material of the wire ends. The bundle of wires may be confined in a metal casing (not shown) and the metal casing may be temporarily bonded to a rigid base as shown in FIG. 11. The spherical metal powder is spread over the exposed wire ends and then a rigid body 50, for example a metal body, is reciprocated under heavy pressure to cause the spherical particles to peen the ends of the individual wires 52. The peening forms end enlargements 54 with the axial depth of the enlargements deeper than the depth of the previously described end enlargements 30. As heretofore described, the end enlargements 54 meet but leave the desired minute gaps, the gaps being located primarily where the spreading ends of any three of the wires tend to meet at a common point.

My description in specific detail of the selected practices of the invention will suggest various changes, substitutions and other departures from my discloure within the spirit and scope of the appended claims.

I claim:

1. A method of fabricating a grid characterized by the steps of:
   arranging a plurality of filaments into a bundle of closely packed substantially parallel filaments forming substantially parallel passages of smaller average cross-sectional area than the individual filaments; and
   deforming the ends of the filaments to enlarge the filament ends to restrict the filter passages.

2. A method of fabricating a grid characterized by the steps of:
   arranging a plurality of filaments into a bundle of closely packed substantially parallel filaments forming substantially parallel passages of smaller average cross-sectional area than the individual filaments;
   radially constricting the bundle with consequent change in cross-sectional configuration and reduction in cross-sectional area of the passages; and
   laterally deforming the ends of the filaments into said passages to restrict the passages.

3. A method of producing a grid of the character described, characterized by the steps of:
   assembling a plurality of wires to form a compact bundle of substantially parallel metal wires forming substantially parallel passages; and
   spreading the end portions of the wires of the bundle laterally into said passages to restrict the passages.

4. A method as set forth in claim 3 in which the spreading step comprises sawing the bundle laterally to produce grids in the form of slices of the bundle with the sawing operation spreading the end portions of the severed wires.

5. A method as set forth in claim 3 in which the spreading step comprises abrading the end portions of the wires.

6. A method as set forth in claim 3 in which the spreading step comprises peening the end portions of the wires.

7. A method as set forth in claim 6 in which the peening step comprises rolling small hard spherical bodies under pressure across the end portions of the wires.

8. A method of producing a grid of the character described, characterized by the steps of:
   assembling a plurality of wires to form a compact bundle of substantially parallel wires forming substantially parallel passages;
   spreading the end portions of the wires of the bundle laterally into said passages to restrict the passages; and
   sintering the bundle to cause the wires of the bundle to adhere to each other and to contract the spread end portions to lessen the restrictions of the passages.

9. A method of fabricating a grid of the character described, including the steps of:
   encasing a bundle of wires in a tube with the consequent formation of numerous longitudinal passages through the tube;
   reducing the diameter of the tube to crowd the wires together to reduce the cross-sectional area of the passages;
   substantially filling the passages with material that will not alloy with the wires and that has a melting point substantially below the melting point of the wires;
   spreading the end portions of the wires laterally into said passages to restrict the passages; and
   removing the low melting material from the restricted passages.

10. A method as set forth in claim 9 which includes the further step of sintering the tube-encased wires.

11. A method of fabricating a grid of the character described, including the steps of:
   encasing a bundle of wires in a tube with the consequent formation of numerous longitudinal passages through the tube;
   swaging the tube to reduce the diameter of the tube to crowd the wires together to reduce the cross-sectional area of the passages;
   substantially filling the passages with material that will not alloy with the wires and that has a melting point substantially below the melting point of the wires;
   severing an end section of the bundle to produce a grid unit and spreading laterally the end portions of the wires of the unit into the passages of the unit to restrict the passages; and
   removing the low melting material from the restricted passages.

12. A method of producing a grid of the character described, characterized by the steps of:
   assembling a plurality of wires to form a compact bundle with the wires of the bundle forming longitudinal passages;
   compressing the bundle transversely to deform the wires with consequent reduction in the cross section of the passages and
   spreading the end portions of the wires of the bundle laterally into said passages to restrict the passages.

13. A method as set forth in claim 12 which includes the further step of sintering the bundle to cause the wires of the bundle to adhere to each other and to contract the spread end portions of the wires to lessen the restrictions of the passages.

14. A grid comprising a compact bundle of wires crowded together and deformed into non-circular cross-sectional configuration with the wires forming longitudinal passages through the bundle and with the ends of the wires of the bundle enlarged to restrict the end portions of the passages.

15. A grid as set forth in claim 14 in which the wires are fused together.

References Cited by the Examiner

UNITED STATES PATENTS 2,619,438   11/1952   Warian et al. _____ 313—349 X
2,988,667   6/1961   Armstrong _____ 313—348

JOHN W. HUCKERT, *Primary Examiner.*

JAMES D. KALLAM, DAVID J. GALVIN, R. F. POLISSACK, *Examiners.*